United States Patent [19]
Lyon

[11] 3,787,188
[45] Jan. 22, 1974

[54] APPARATUS FOR CATALYTIC REACTIONS
[75] Inventor: George W. Lyon, Midland, Mich.
[73] Assignee: The Dow Chemical Company, Midland, Mich.
[22] Filed: Nov. 26, 1971
[21] Appl. No.: 202,375

[52] U.S. Cl. .......... 23/288 R, 23/288 L, 260/669 R
[51] Int. Cl...... B01j 9/04, C07c 15/02, C07c 15/10
[58] Field of Search.. 23/288 R, 288 K, 288 L, 289; 260/669 R, 699, 700

[56] References Cited
UNITED STATES PATENTS

| | | | |
|---|---|---|---|
| 1,848,466 | 3/1932 | Edmonds | 23/289 |
| 1,850,398 | 3/1932 | Jaeger | 23/288 R |
| 1,893,372 | 1/1933 | Kryzanowsky | 23/288 L |
| 1,893,492 | 1/1933 | Brill | 23/289 |
| 3,161,669 | 12/1964 | Statman et al. | 23/288 L X |
| 3,663,179 | 5/1972 | Mehta et al. | 23/289 |

Primary Examiner—Joseph Scovronek
Attorney, Agent, or Firm—William M. Yates et al.

[57] ABSTRACT

A catalytic reactor has separate inlet ports for a hydrocarbon stream which is to be dehydrogenated and for a heated fluid stream which maintains the reaction temperature such that the hydrocarbon and the heat maintaining fluid are mixed in the presence of catalyst. One of the streams flows through the catalyst linearly and the other flows radially. The method of dehydrogenating ethyl benzenes and ring substituted derivatives thereof to the corresponding styrenes using a hot fluid stream as a means for maintaining the reaction temperature, and using the above reactor, reduces the cracking of the ethyl benzenes and corresponding styrenes to benzene and its homologs and to carbonaceous products.

6 Claims, 2 Drawing Figures

APPARATUS FOR CATALYTIC REACTIONS

This invention relates to catalytic reactors having separate inlet ports for feeding a reactant and a temperature maintaining or controlling fluid medium into the reactor, such that the fluid medium and the reactants are blended or mixed in the presence of a catalyst, and to a method of dehydrogenating alkyl aromatic hydrocarbons having at least one alkyl group of two to three carbon atoms which is converted to a corresponding vinyl aromatic derivative by dehydrogenation, by passing the alkyl aromatic compound into a reactor through one port at a temperature below cracking temperature for the hydrocarbon and passing a fluid medium at an elevated temperature through a second inlet port, mixing the two streams in the presence of a dehydrogenation catalyst, and maintaining the temperature in the catalyst bed at the dehydrogenation temperature of the alkyl aromatic compound. In the reactor, and method, one stream flows radially and the other flows axially into the catalyst bed.

More particularly, the invention concerns a catalytic reactor having an entry port for a stream of an alkyl aromatic compound at a temperature below the reaction or dehydrogenation temperature of the compound and a separate entry port for a stream of a heat supplying gaseous medium which is inert in the reaction system, such that the streams are first mixed in the catalyst bed and to a method of dehydrogenating alkyl aromatic compounds in the presence of a self-regenerative catalyst by mixing the alkyl aromatic compound with an inert heat supplying gaseous medium to raise the mixture to dehydrogenation temperature in the catalyst bed and thereby convert the alkyl aromatic compounds to the corresponding vinyl aromatic derivatives. Catalytic dehydrogenation reactions of alkyl aromatic compounds, in which the alkyl group contains at least two carbon atoms to the corresponding vinyl aromatic compounds, are highly endothermic and are effected at temperatures in the range of the thermal cracking temperature of the hydrocarbon.

Prior art dehydrogenation procedures, as typified by those used for dehydrogenation of ethyl benzene to styrene, the ethyl benzene is fed to a mixing chamber at about 450°-500°C. where it is mixed with sufficient steam at 650°-700°C. to provide a temperature of about 575°-650°C. The mixture is fed over a catalyst bed where the dehydrogenation is effected in an endothermic reaction. There are rather critical limits on the temperature to which the ethyl benzene or other alkyl aromatic hydrocarbon compound can be heated, while in contact with metal surfaces, in the absence of catalyst. Metal surfaces at temperatures of 675°C. or higher accelerate the decomposition of ethyl benzene to produce benzene and other decomposition products, including carbon. It is therefore necessary to maintain a temperature of the mixture below 675°C. and usually it is held at 630°-650°C. to minimize ethyl benzene decomposition.

SUMMARY OF THE INVENTION

This invention relates to a catalytic reactor having separate inlet means for a reactant stream of a component to be dehydrogenated and for a heat maintaining fluid stream such that the streams are commingled in the presence of a catalyst. One of said streams flows axially through the catalyst bed and the other stream flows radially into and then axially through the catalyst bed.

DETAILED DESCRIPTION OF THE INVENTION

Figure 2:
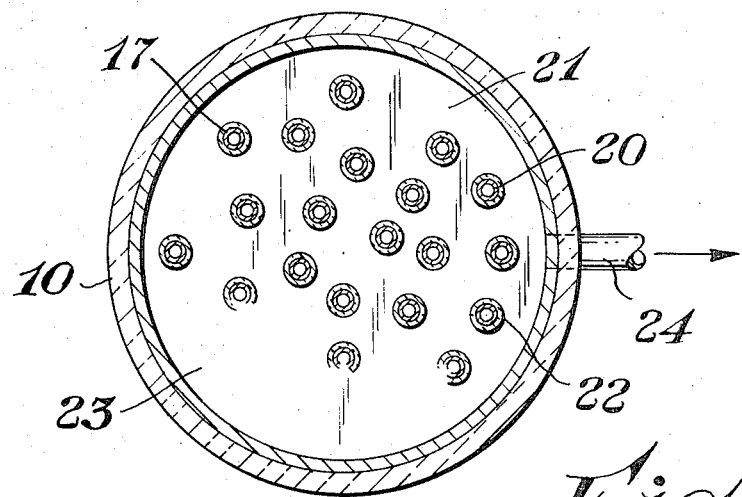
FIG. 2 is a cross-section along lines 2—2 of FIG. 1.
Figure 1:
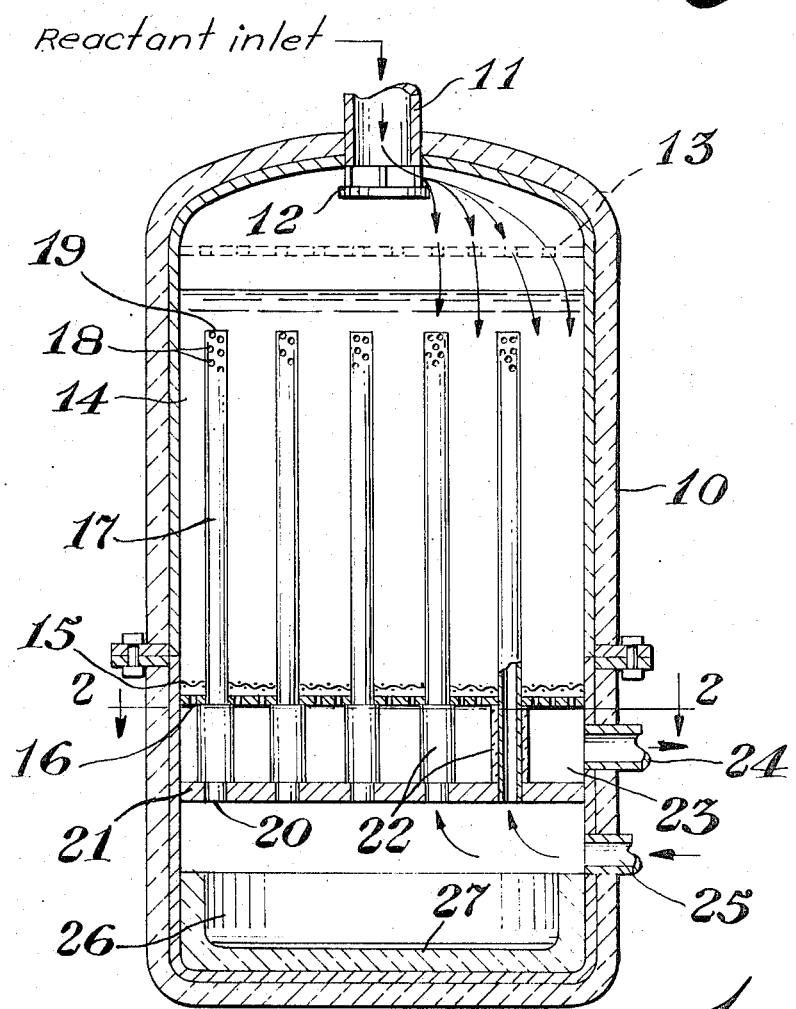
FIG. 1 is an elevation, partly in section, of the reactor.

Referring to the drawing, FIG. 1, 10 is a reactor shell having at its top a flanged inlet port 11. Shell 10 preferably has an insulating coat (not shown) to minimize loss of heat by radiation. A deflector 12, attached to shell 10 is situated at the base of and attached to the walls of port 11. Beneath the deflector, optionally, is a foraminous distributor 13. A catalyst zone 14, located between a tube sheet or a support plate and below inlet 11 extends from a position below distributor 13, to a screen 15 which has openings small enough to retain the catalyst. Screen 15 is supported on a perforated plate or tube sheet 16, which can have up to 50 percent on its surface area open. Plate 16 preferably abuts tightly against the inner periphery of shell 10 and can, if desired, be welded to the shell. Through plate 16 and screen 15 protrude a plurality of tubes 17, each of which has a plurality of openings 18, at its upper surface and an imperforate top 19 and opening 20 at the base. Openings 18 are fine enough to prevent entry of catalyst or if the catalyst is finely divided, the openings are covered with a screen of mesh size such that catalyst is retained in the bed. The tubes serve as an inlet for a component into the reactor. Tubes 17 are mounted in a single tube sheet 21. Each tube 17 can, if desired, contain an external insulating sleeve 22, extending from tube sheet 21 to the catalyst support plate 16, to minimize heat transfer to passageways 23. Passageways 23 serve as reservoir manifold for reacted components leading to flanged outlet 24. Near the base of the reactor is another flanged inlet port 25 leading to a reservoir 26 for a feed component into the reactor. The base of inlet port can be insulated either internally or externally against heat loss, the internal insulation being shown at 27.

The insulating sleeves 23 and insulating base material 27 can be made of porcelain, fire brick, asbestos or any other heat insulating material which will not effect an unwanted reaction with a feed ingredient or a desired ingredient obtained in the reaction.

The single tube sheet arrangement of the reactor minimizes the stresses due to expansion and contraction of metal, as compared with a double tube sheet reactor. The operation of the reactor is described with reference to dehydrogenation of ethyl benzene to styrene, although it is to be understood that any other catalytic reaction can be performed therein. Ethyl benzene preheated to about 450° to 550°C. is fed into the reactor as vapor through port 11. Steam at a temperature of about 650° to about 875°C. is fed through port 25 in a ratio of about 0.8 to 2 pounds per pound of ethyl benzene. The steam enters insulated reservoir 26, passes through openings 20 and tubes 17 and enters the bed 14 through openings 18, where it commingles with ethyl benzene. Tubes 17, which carry the hot steam will also transfer heat by conduction to the catalyst area surrounding the tubes. Thus, with proper size and spacing it is possible to maintain the entire catalyst bed at reaction temperature, even though the reaction itself is endothermic. Preferably, the tubes 17 have inner diameters of from about 2 to about 6 inches and are spaced from about 1 to about 3 tube diameters apart. The spacing is preferably about equidistant, so as to maintain a relatively uniform temperature profile in a catalyst bed cross section. Thus, the ethyl benzene temperature is not raised to dehydrogenation temperature until it is in contact with a dehydrogenation catalyst. In this manner conversion of ethyl benzene to unwanted side reaction products is greatly minimized. Further, it has been found that temperatures at which ethyl benzene is decomposed in the presence of metal surfaces can be readily attained in the catalyst bed without appreciable decomposition of the ethyl benzene with and greater tendency to dehydrogenate to styrene. The reaction mixture passes through the catalyst bed 14, screen 15 and screen support 16 into passageway 23 and out of the reactor through outlet 24.

For other reactions in which the temperature need not be controlled as closely as that needed for preparing styrene, as described, the steam can be fed through port 11 and preheated hydrocarbon can be fed through inlet port 25. Mixing of the steam and hydrocarbon vapors will not be effected until the catalyst bed is reached. Otherwise the procedure for dehydrogenating ethyl benzene is the same as above described.

Catalysts which can be used for dehydrogenating ethyl benzene to styrene are well known. Preferred is a self regenerative catalyst. A representative catalyst is one which contains about 65 to about 90 weight percent ferric oxide, about 2 to about 5 percent chromium oxide and about 10 to about 35 percent potassium carbonate and the remainder being binders, which may be partially removed in a calcining step. Included but not limited thereto are catalysts described in U. S. Pat. Nos. 3,084,125; 3,361,683; 2,395,875; 2,395,876; 2,408,140; 2,414,585; 2,461,147 and Reissue Pat. No. 22,800. Any other dehydrogenation catalyst is operative.

The reactor can be made of a variety of materials of construction including 18/8 type stainless steels, low nickel high chrome stainless steels of the ASI 400 series, the various clad stainless steels, ceramic lined steels including the stainless steels mentioned above, and if temperatures of reaction permit, carbon steels.

The reactor has been specifically described as useful for dehydrogenating ethyl benzene to styrene. However, it can be used in any catalytic reaction where it is desirable to maintain a temperature of a reactant or product of reaction below decomposition temperature in the absence of a catalyst, to minimize mixing of two or more reactants in the absence of a catalyst or where it is desirable to control a reaction temperature within specified limits by controlling the proportion and temperature of components fed into the reactor.

The reactor is particularly useful for adiabatic dehydrogenations of other alkyl aromatics including isopropylbenzene, diethyl benzene, ethyl toluene, diethyl toluene, ethyl xylene, ethyl naphthalene and other such aromatic compounds having from 1 to 3 alkyl groups of which 1 to 2 contain two to three carbon atoms of the dehydrogenation of $C_2$-$C_6$ aliphatic alkanes or alkenes to a mixture of alkenes or a mixture of alkenes and dienes or $C_4$-$C_6$ alkenes to dienes. Included in the $C_2$-$C_6$ dehydrogenation reactions are the conversion of ethane to ethylene, propane to propylene, n-butane to n-butene and butadiene, pentanes to pentenes and 1,3-dimethyl butane to 1,3-dimethyl butenes and butadienes. The reactions of the $C_4$-$C_6$ alkenes include dehydrogenations, n-butenes to butadiene, isopentane, pentenes, and pentadiene, 2-methyl butene to isoprene and 2,3-dimethyl butene, 1 to 2,3-dimethyl butadiene.

I claim:

1. A catalytic reactor comprising a shell having an inlet port for a reactant at one end of said reactor, a separate inlet port at the other end of said reactor for feeding a temperature controlling fluid into the reactor, perforate support means at the base of a catalyst zone for passage of reacted materials into a manifold communicating with an outlet means for withdrawing reaction effluent from the reactor, said outlet means being spaced above said separate inlet port, said separate inlet port communication with a reservoir having a tube sheet connected to a plurality of inlet tubes passing through said manifold into said catalyst zone, and means for first mixing said reactant and said temperature controlling fluid in a fixed catalyst bed.

2. The structure of claim 1 in which the inlet port for the reactant is at the top of the reactor and the inlet port for a temperature controlling fluid is in the bottom portion of the reactor.

3. The structure of claim 1 in which the inlet port for the temperature controlling fluid comprises a plurality of spaced tubes extending from said tube sheet below the effluent port and terminating in and slightly below the top of the catalyst bed, said tubes being externally insulated between said tube sheet and said perforate support means.

4. The structure of claim 3 in which the tubes have a diameter of from about 2 to about 6 inches and are spaced from each other by a distance of from about 1 to 3 tube diameters.

5. The structure of claim 4 in which each tube has an imperforate top and a plurality of openings adjacent the top for passage of the temperature controlling fluid into the catalyst bed.

6. The structure of claim 1 having a deflector at the top inlet port, a distributor plate spaced above the catalyst bed, the perforate support means being a screened perforate plate, a reservoir for said temperature controlling fluid, and a plurality of tubular members extending from said reservoir and terminating in the catalyst bed, said tubular members having an imperforate top and openings adjacent the top for passage of said fluid into the catalyst bed.

* * * * *